A. THIEL.
FEED BAG.
APPLICATION FILED SEPT. 30, 1907.
908,518.
Patented Jan. 5, 1909.
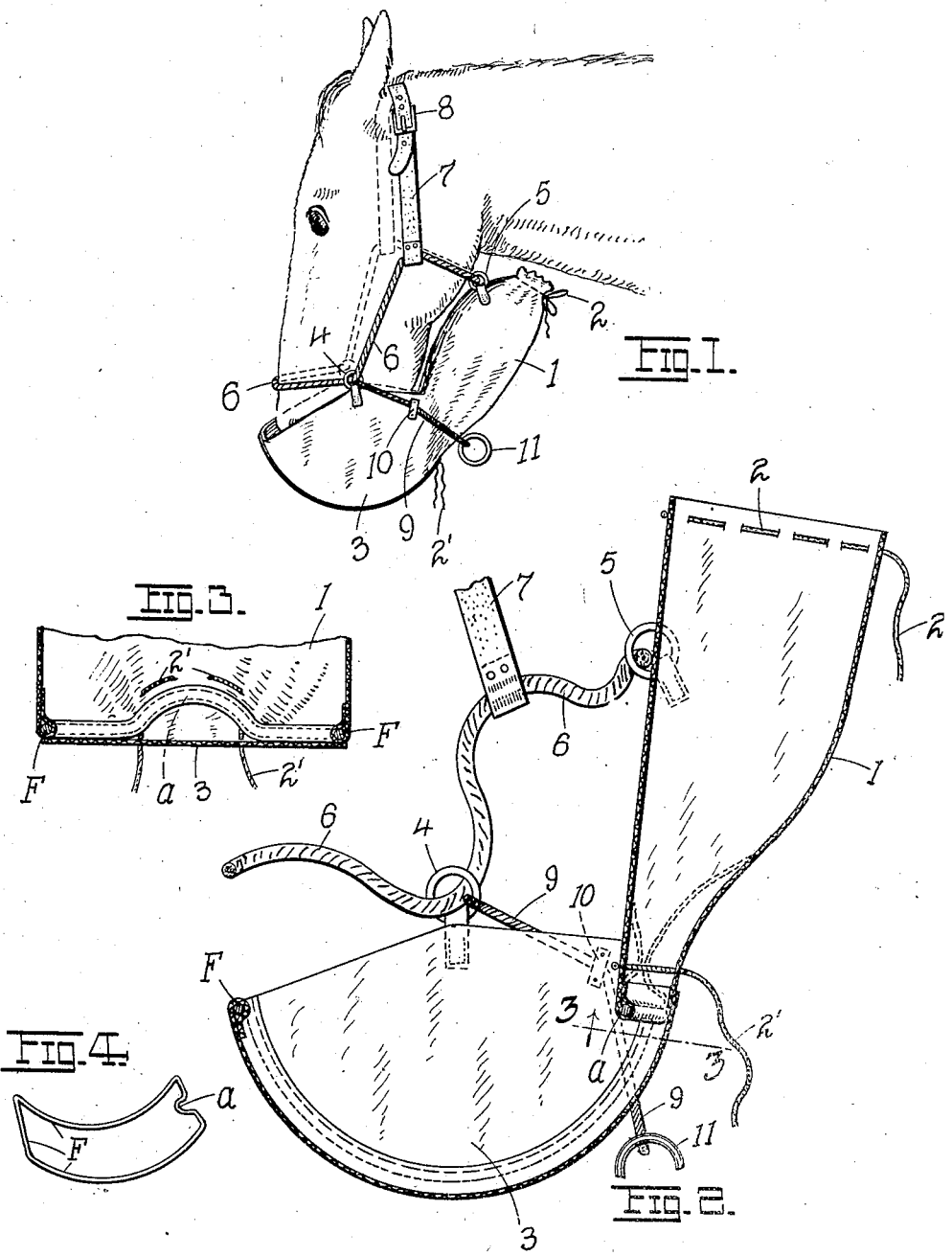

UNITED STATES PATENT OFFICE.

ADOLPH THIEL, OF ST. LOUIS, MISSOURI.

FEED-BAG.

No. 908,518.            Specification of Letters Patent.           Patented Jan. 5, 1909.

Application filed September 30, 1907. Serial No. 395,148.

*To all whom it may concern:*

Be it known that I, ADOLPH THIEL, citizen of the United States, residing at St. Louis, State of Missouri, have invented certain new and useful Improvements in Feed-Bags, of which the following is a full, clear, and exact description, reference being had to the accompanying drawings, forming a part hereof.

My invention has relation to improvements in feed-bags; and it consists in the novel construction and arrangement of parts more fully set forth in the specification and pointed out in the claims.

In the drawings, Figure 1 is a side elevation of my feed-bag showing the application thereof; Fig. 2 is a vertical longitudinal middle section thereof; Fig. 3 is a sectional detail on the line 3—3 of Fig. 2; and Fig. 4 is a perspective of the wire frame entering into the construction of the feed receptacle.

The object of my invention is to construct a feed-bag and a halter combined, with suitable provision for attaching a hitching strap thereto while the animal is feeding. A further object is to provide the bag with a sack in which the feed can be temporarily stored until occasion arises to supply the same to the animal.

In detail the invention may be described as follows:

Referring to the drawings, 1 represents a sack made of canvas or duck or other suitable material, the sack being open at both ends and adapted to be closed by draw-strings, 2, 2'.

F represents a wire frame having a front straight edge, concave sides, and a rear straight edge, the latter having an inwardly convexed or bent portion *a* forming a reinforced wall for the delivery end or discharge mouth of the sack 1 normally closed by the draw-string 2'. The frame F is covered with suitable material such as canvas forming a concave grain receptacle 3 from which the animal directly feeds, the sack 1 thus forming an upper extension for the receptacle. Passed through suitable loops or rings 4, 4 at the sides of the receptacle 3, and secured to rings 5, 5 on the front wall of the sack, is a nose band 6, to which in turn is secured the strap 7 adapted to be passed over the animal's head, the parts 6 and 7 forming collectively a halter. The length of the strap 7 is adjustable by shifting the buckle 8 thereof as is obvious. The rings 4 likewise serve as means for securing the ends of a bottom band 9, passed through loops 10 on the receptacle, the band 9 having suspended therefrom a ring 11 to which a hitching-strap (not shown) may be attached, and the animal tied to a post or any convenient place while feeding.

The sack 1 is filled with grain through the outer open end, the draw-strings 2' being first drawn tight to close the discharge end of the sack, then the strings 2 are drawn to close the sack. When the animal is to be fed, the device is attached to the animal's head as shown in Fig. 1, the string 2' loosened sufficiently to allow the grain to flow into the receptacle at any required rate of speed, the stiff wall of the discharge mouth formed by the reinforced section *a* preventing any possible collapse of the pliable canvas to choke and interfere with the free flow of the grain.

Having described my invention, what I claim is:

1. A feed bag comprising an open feed receptacle having a wire reinforcing frame provided with front and rear straight edges and concavo-convex sides, the rear edge having an inwardly bent rigid portion, a sack forming an extension of the receptacle and having a discharge end opposite the bent portion of the frame aforesaid, separate means whereby the respective ends of the sack may be closed and opened, and means for attaching the bag to the head of the animal, substantially as set forth.

2. A feed-bag comprising a feed-receptacle, a sack attached thereto and adapted to supply the grain to the receptacle, a head stall coupled to the receptacle and sack, and a band disposed along the sides and rear of the receptacle and having a ring for attaching to a hitching-strap, substantially as set forth.

In testimony whereof I affix my signature, in presence of two witnesses.

ADOLPH THIEL.

Witnesses:
     W. C. KILLEEN,
     H. G. MOEHLE.